(12) United States Patent
Wang (10) Patent No.: US 11,871,442 B2
(45) Date of Patent: Jan. 9, 2024

(54) METHODS AND DEVICES FOR RESOURCE SELECTION

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 381 days.

(21) Appl. No.: 17/275,362

(22) PCT Filed: Sep. 14, 2018

(86) PCT No.: PCT/CN2018/105831
§ 371 (c)(1),
(2) Date: Mar. 11, 2021

(87) PCT Pub. No.: WO2020/051911
PCT Pub. Date: Mar. 19, 2020

(65) Prior Publication Data
US 2022/0053498 A1    Feb. 17, 2022

(51) Int. Cl.
*H04W 4/00* (2018.01)
*H04W 72/563* (2023.01)
*H04W 4/029* (2018.01)
*H04W 4/40* (2018.01)

(52) U.S. Cl.
CPC ......... *H04W 72/563* (2023.01); *H04W 4/029* (2018.02); *H04W 4/40* (2018.02)

(58) Field of Classification Search
CPC ...... H04W 72/563; H04W 4/029; H04W 4/40
See application file for complete search history.

(56) References Cited

U.S. PATENT DOCUMENTS

2018/0115970 A1   4/2018   Chae et al.
2018/0234898 A1   8/2018   Kahtava et al.

FOREIGN PATENT DOCUMENTS

| CN | 107295456 A | | 10/2017 |
|---|---|---|---|
| CN | 107295562 A | * | 10/2017 |
| CN | 108260082 A | | 7/2018 |
| KR | 20190085819 A | * | 7/2019 |
| WO | 2017/136001 A1 | | 8/2017 |

OTHER PUBLICATIONS

Written Opinion for PCT/CN2018/105831, dated Jun. 12, 2019.
International Search Report for PCT/CN2018/105831, dated Jun. 12, 2019.

* cited by examiner

*Primary Examiner* — Erika A Washington
(74) *Attorney, Agent, or Firm* — Sughrue Mion, PLLC (57) ABSTRACT

Embodiments of the present disclosure relate to methods, devices and computer readable mediums for resource selection. The method comprises: receiving, at a first terminal device, a message from a second terminal device, the message indicating information associated with vehicle-to-everything (V2X) communication during movement of the second terminal device; and determining, at least partially based on the message, a resource for the first terminal device to perform the V2X communication.

3 Claims, 5 Drawing Sheets

METHODS AND DEVICES FOR RESOURCE SELECTION

TECHNICAL FIELD

Embodiments of the present disclosure generally relate to the field of telecommunication, and in particular, to methods and devices for resource selection.

BACKGROUND

Device to device (D2D) communication has been developed for years and have been extended to include vehicle-to-everything (V2X) communication. For example, in current telecommunication specifications such as the 3rd Generation Partnership Project (3GPP) specification Release 14, the extensions for the D2D work consist of support of V2X communication. V2X communication includes any combination of direct communication between vehicles, pedestrians, infrastructures, and networks, and thus can be divided into the following four different types: Vehicle-to-Vehicle (V2V), Vehicle-to-Pedestrian (V2P), Vehicle-to-Infrastructure (V2I), Vehicle-to-Network (V2N). V2V communication includes communication between vehicles; V2P communication includes communication between a vehicle and a device carried by an individual (for example, a handheld user terminal carried by a pedestrian, cyclist, driver, or passenger); V2I communication includes communication between a vehicle and infrastructures supporting V2X applications, such as roadside units (RSUs) which are transportation infrastructure entities; and V2N communication includes communication between a vehicle and network infrastructures such as a network terminal.

LTE V2X has been implemented in Rel-14. In Rel-14, two resource allocation modes are specified in LTE V2X, i.e. mode 3 (eNodeB scheduling based resource allocation) and mode 4 (terminal device autonomous resource selection). Mode 4 sensing based resource selection was specified for terminal device autonomous transmissions. For periodic traffic, semi-persistent transmission (SPT) is employed to achieve collision avoidance by sensing, that is, the past resource usage is sensed to predict the future resource usage. In new radio (NR) V2X communications, aperiodic traffic needs to be supported, e.g. extended sensors, packet arrival time and packet size depend on the number and properties of the sensed objects. Thus, a sensing based resource selection will not be support for aperiodic traffic.

SUMMARY

In general, example embodiments of the present disclosure provide methods and devices for resource selection.

In a first aspect, there is provided a method implemented at a terminal device. The method comprises: receiving, at a first terminal device, a message from a second terminal device, the message indicating information associated with vehicle-to-everything (V2X) communication during movement of the second terminal device; and determining, at least partially based on the message, a resource for the first terminal device to perform the V2X communication.

In a second aspect, there is provided a terminal device. The device comprises at least one processor; and at least one memory including computer program codes. The at least one memory and the computer program codes are configured to, with the at least one processor, cause the device at least to perform the method according to the first aspect.

In a third aspect, there is provided a computer readable medium having a computer program stored thereon which, when executed by at least one processor of a device, causes the device to carry out the method according to the first aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB), a next generation NodeB (gNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
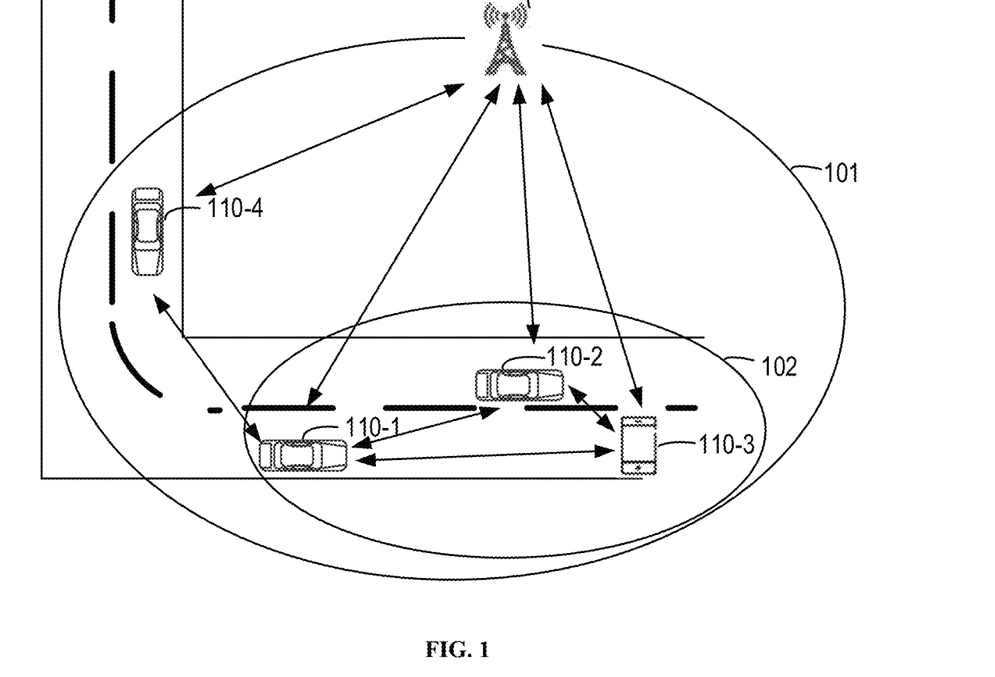
FIG. 1 shows an example communication environment 100 in which embodiments of the present disclosure can be implemented.

FIG. 1 shows an example communication environment 100 in which embodiments of the present disclosure can be implemented. In the environment 100, vehicles 110-1-110-3 and a personal mobile device 110-4 are terminal devices (collectively or individually referred to as terminal device 110) and can communicate with each other. A cellular network device 120 is also deployed in the environment and provides services to those terminal devices that are in their coverage 101 and access to the cellular network. It would be appreciated that the terminal devices, and the links there between are shown merely for illustration. There may be various other terminal devices and network devices in V2X communication in many other ways.

The network device 120 may divide different zones according to the relative location with the terminal devices 110 (or according to the absolute location of the terminal device 110), such as the coverage 102 (also referred to as zone 102) shown in FIG. 1. Some terminal devices may locate in zone 102 (for example, terminal device 110-1, 1110-2 and 110-4) and some terminal device may locate outside of zone 102 (for example, terminal device 110-3). The terminal devices located in different zones may also communicate with each other.

The environment 100 illustrates a scenario of V2X communication where vehicles and any other devices (a network device 120) can communicate with each other. As mentioned above, V2X communication can be divided into four types, including Vehicle-to-Vehicle (V2V), Vehicle-to-Pedestrian (V2P), Vehicle-to-Infrastructure (V2I), Vehicle-to-Network (V2N). Communication between terminal devices 110 (that is, V2V, V2P, V2I communications) can be performed via both Uu interface and direct links (or sidelinks), while communication involving the network device 120 (that is, V2N communication) can be performed only via the Uu interfaces. For sidelink-based V2X communication, information is transmitted from a TX terminal device to one or more RX terminal devices in a broadcast manner.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In Release 14, mode 4 sensing based resource selection was specified for UE-autonomous transmissions. Mode 4 requires that all/most of terminal devices reserves the resources in the resource pool periodically. For periodic traffic, semi-persistent transmission (SPT) is employed to achieve collision avoidance by sensing. In other words, most of traffics are periodic and for the resource selection performed by the terminal device, the future resource usage may be predicted based on sensing results in the past.

For example, sensing based terminal device autonomous resource selection has been supported in Rel-14 LTE-V. In this case, the terminal device may perform the resource selection at a certain subframe, for example, the subframe n, based on the sensing result within a certain range of the subframes, for example, with a range of subframes [n-1, n-1000], then the terminal device may select a resource from the candidate resources within the resource selection window and reserve the same frequency resource with a reservation interval for several times. In other words, the resource within the resource selection window could be selected periodically. The data transmission scheduled on the $i^{th}$ resource indicates that the i+1th resource should be reserved for data transmission.

In this case, when the terminal device select a resource within the resource selection window, the terminal device may determine the occupied resources within the resource selection window based on a Scheduling Assignment (SA) decoding.

Furthermore, the terminal device may perform an energy measurement before the resource selection and select the resource within the resource selection window based on the result of the energy measurement, to avoid the collision and interference of channel.

As a further example, zone based resource pool selection has been supported in Rel-14 LTE-V. In this case, the terminal device may determine the identifier (ID) of the zone where the terminal device is located and select a resource from a resource pool associated with the zone. As used herein, the term "zone" may refer to as a geographical zone.

As described above, the network device may divide different zones according to the relative location with the terminal devices (or according to the absolute location of the terminal devices). The terminal device may determine the ID of the zone where the terminal device is located by means of the GPS device integrated in the terminal device.

The determining the zone ID, Equations (1)-(3) are represented as below:

$$x'=\text{Floor } (x/L) \text{ Mod } Nx \quad (1)$$

$$y'=\text{Floor } (y/W) \text{ Mod } Ny \quad (2)$$

$$\text{Zone\_id}=y'*Nx+x' \quad (3)$$

where L is the value of zoneLength included in zoneConfig in SystemInformationBlockType21 or in SL-V2X-Preconfiguration; W is the value of zone Width included in zoneConfig in SystemInformationBlockType21 or in SL-V2X-Preconfiguration; Nx is the value of zoneIdLongiMod included in zoneConfig in SystemInformationBlockType21 or in SL-V2X-Preconfiguration; Ny is the value of zoneIdLatiMod included in zoneConfig in SystemInformationBlockType21 or in SL-V2X-Preconfiguration; x is the geodesic distance in longitude between the terminal device's current location and geographical coordinates (0, 0) according to WGS84 model [80] and it is expressed in meters; y is the geodesic distance in latitude between the terminal device's current location and geographical coordinates (0, 0) according to WGS84 model [80] and it is expressed in meters.

Figure 2:
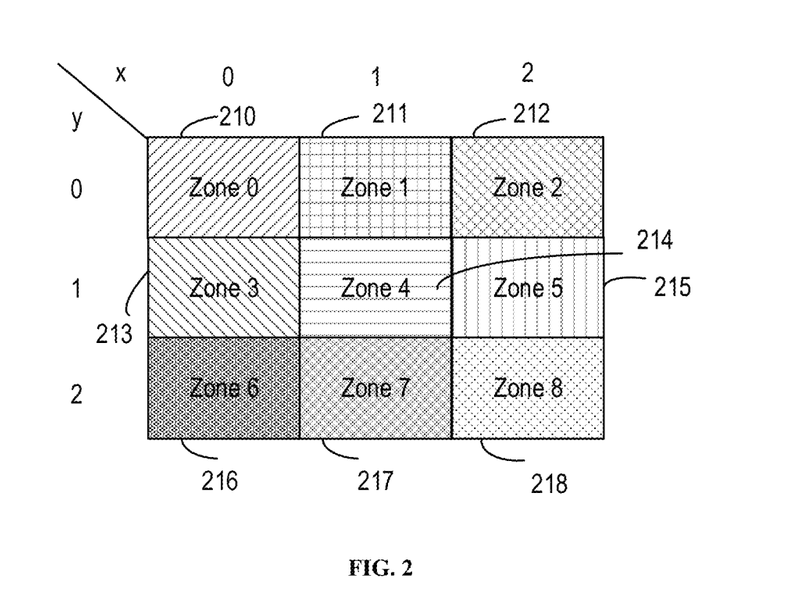
FIG. 2 shows an example of some embodiments of the present disclosure.

FIG. 2 shows diagram of an example of zone ID. As shown in FIG. 2, the ID (ID "0"-"8") of the zones 210-218 may be determined according the Equations (1)-(3) and the coordinate in x axis and y axis.

However, in new radio (NR) V2X communication, aperiodic traffic needs to be supported, e.g. extended sensors, packet arrival time and packet size depend on the number and properties of the sensed objects. Further, different TTI lengths may be mixed in one resource pool in NR V2X communication, which renders the measurement results of Received Signal Strength Indication (RSSI) are not accurate. Furthermore, V2X traffic has stringent latency requirement, CSMA/CA based resource selection cannot guarantee latency in a congestion scenario. Thus, a sensing based resource selection will not be support for aperiodic traffic.

According to embodiments of the present disclosure, there is provided a solution for resource selection to support aperiodic traffic required in NR V2X communication. In this solution, the terminal device selects a resource based on the message transmitted from a further terminal device, the message may indicate information associated with V2X communication during movement of the further terminal device. More details of the embodiments of the present disclosure will be discussed with reference to FIGS. 3 to 10.

Principle and implementations of the present disclosure will be described in detail below with reference to FIG. 3, which shows process 300 according to example embodiments of the present disclosure. For the purpose of discussion, the process 300 will be described with reference to FIG. 1.

Before the terminal device 110-1 perform transmission in a data layer or in a control signaling layer, the resource for transmission should be determined by the terminal device 110-1. As descried above, due to the aperiodic traffic adopted in NR V2X communication, it is difficult to predict the future usage of the resource based on the past usage of resource. Thus, the terminal device 110-1 may determine the resource for transmission based on the messages transmitted from other terminal devices.

Figure 3:
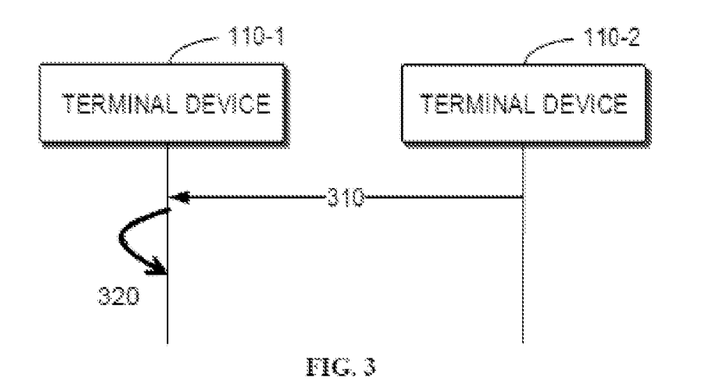
FIG. 3 shows a diagram of an example process 300 for resource selection according to some embodiments of the present disclosure.

As shown in FIG. 3, the terminal device 110-1 receives 310 a message from the terminal device 110-2. The message indicates information associated with V2X communication during movement of the terminal device 110-2.

In some embodiments, the message may comprise parameters associated with the movement of the terminal device 110-2, wherein the parameters may comprise at least one of the following: the geographical information of the terminal device 110-2, a velocity of the movement; an acceleration of the movement and a moving direction of the movement.

In this case, the message may be received as the basic safety message (BSM) or the Co-operative Awareness Message (CAM) broadcasted by the terminal device 110-2. It should be understand that the terminal device 110-1 may also receive the message from other terminal devices, such as the terminal device 110-4. The terminal device 110-1 may also receive the message from the stationary terminal, for example, the terminal device 110-3.

In some embodiments, the terminal device may determine the geographical coordinate of the second terminal device 110-2 based on the message. In order to ensure that the received message is an effective message, in some embodiments, the terminal device may determine the geographical location information, such as the geographical coordinate of the second terminal device 110-2 based on the message received within a predetermined time period E, for example, the predetermined time period E may be the latest several second before a current time point.

In some embodiments, the application layer of the first terminal device 110-1 determines the geographical coordinate of the second terminal device 110-2. The geographical coordinates of the second terminal device 110-2 may be transferred to radio layer the first terminal device 110-1.

As shown in FIG. 3, the terminal device 110-1 determines 320 a resource for the terminal device 110-1 to perform the V2X communication, at least partially based on the message. In this case, the terminal device 110-1 may determine whether the terminal device 110-2 is located within a first zone where the terminal device 110-1 is located based on the message transmitted from the terminal device 110-2. For determining the location of the terminal device 110-2, the terminal device 110-1 may determine whether the ID of a zone, which the terminal device 110-2 is located, is same as the ID of the first zone.

In some embodiments, the ID of the first zone, where the terminal device 110-1 is located, may be obtained based on the message, such as BSM as mentioned above, transmitted from the terminal device 110-1 before a predetermined time period, rather than based on the geographical coordinates measured by the GPS device integrated in the terminal device 110-1 in a current time point, because the geographical coordinates measured by the GPS device integrated in the terminal device 110-1 would not be obtained by other terminal devices, for example, the terminal device 110-2.

However, two zones having the same zone ID do not necessarily mean that they are the same zone. Thus, if the terminal device 110-1 determines that the terminal device 110-2 has a zone ID which is same as the ID of the first zone, the terminal device 110-1 may further determine whether the terminal device 110-2 is located within a first zone based on the geographical location of the terminal device 110-2, namely, the terminal device 110-1 determine both distances in a longitude and a latitude directions between the terminal device 110-1 and the terminal device 110-2. In general, a zone has predetermined length and width, which are configured by the network device 120 or pre-configured. Thus, the terminal device 110-1 may compare the distance L in the longitude direction between the terminal device 110-1 and the terminal device 110-2 with the length of the first zone and compare the distance W in the latitude direction between the terminal device 110-1 and the terminal device 110-2 with the width of the first zone. If the distance L is less than the length of the first zone and the distance W is less than the width of the first zone, the terminal device 110-1 may determine that the terminal device 110-2 is located within a first zone.

It should be understood that the terminal device 110-1 may also determine whether other terminal devices, such as the terminal device 110-3 and 110-4, are located within a first zone based on the message transmitted from other terminal devices. For example, the terminal device 110-1 may determine that the terminal device 110-3 is also located within the first zone and the terminal device 110-4 is located outside the first zone. Thus, the terminal device 110-1 may determine the number of terminal devices within the first zone at a current time point.

In some embodiments, the terminal device 110-1 may select a resource from a set of resources allocated to the first zone. The set of resources allocated to the first zone may obtain from the ID of the first zone, which are configured by the network device 120 when the terminal device 120 determines the division of the zones or pre-configured. The corresponding indices may indicate each resource of the set of resources allocated to the first zone.

Figure 4:
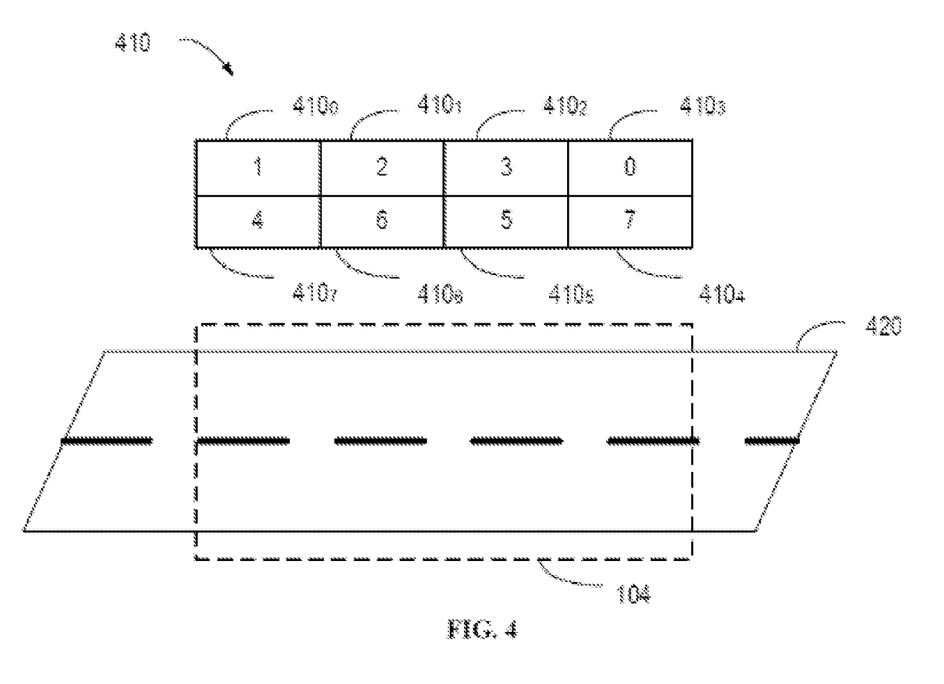
FIG. 4 shows an example of some embodiments of the present disclosure.

FIG. 4 shows an example of some embodiments of the present disclosure. As shown in FIG. 4, there is a zone 104, for example, the first zone, on the road 420. A set of resources 410₀-410₇ is allocated to the zone 104. Each resource in the set 410 of the resources may be the candidate resource, which could be selected by the terminal device located within the zone 104 for transmission. Each resource in the set 410 of the resources may be indicated by a corresponding index. For example, the resource 410₀ has a resource index "1".

In some embodiments, the set of resources may be defined as several Physical Resource Blocks (PRBs) within one slot, or several PRBs in the plurality of slots M and the set of resources could occur periodically. For the case of the several PRBs in the plurality of slots, the duration of the plurality of slots M may be less than the latency requirement of services in the NR V2X communication, which may inform from the network device 120.

Figure 5:
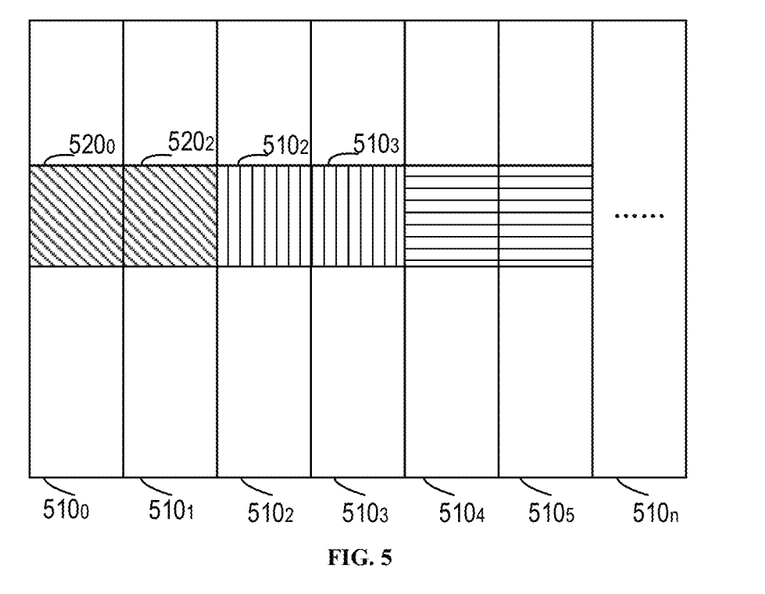
FIG. 5 shows an example of some embodiments of the present disclosure.

FIG. 5 shows an example of some embodiments of the present disclosure. In some embodiments, if the terminal device 110-1 determines the geographical location of the terminal device 110-2 at n slot, the terminal device 110-1 may consider the set of resource in a slot, which is later than the slot, as the set of resources for the resource selection.

In some embodiments, for the case of the several PRBs in one slot, if the terminal device 110-1 determines the geographical location of the terminal device 110-2 at n slot, the terminal device 110-1 may determine a set of resources in slot n+k1 as the set of resources for the resource selection. For the case of the several PRBs in the plurality of slots, if the terminal device 110-1 determines the geographical location of the terminal device 110-2 at n slot, the terminal device 110-1 may determine a set of resources starting not earlier than slot n+k2 as the set of resources for the resource selection. For this case, FIG. 5 shows an example of some embodiments of the present disclosure. As shown in FIG. 5, the set of resources may start from slot 510₀ and the two PRBs 520₀ and 520₁ of the set of resources may be divided in two slots, namely, slot 510₀ and 510₁. Thus, if the terminal device 110-1 determines the geographical location of the terminal device 110-2 at slot 510₀, the terminal device 110-1 may determine a set of resources starting not earlier than slot 510₂, for example, a set of resources comprising the PRB 520₂ in slot 510₂ and the PRB 520₃ in slot 510₃, as the set of resources for the resource selection. It should be understood that the value of K1 and K2 may be predetermined by the terminal device 110-1

Figure 6:
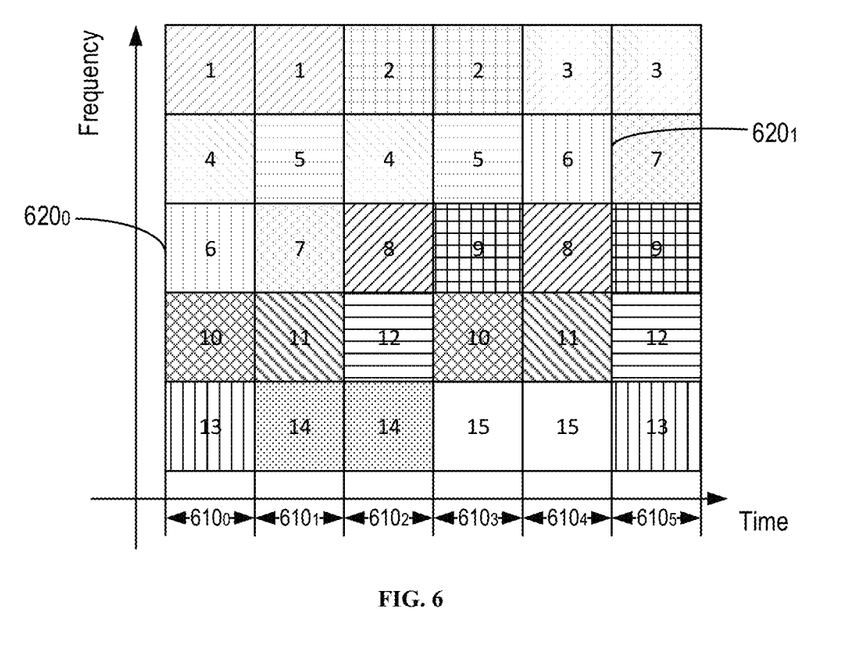
FIG. 6 shows an example of some embodiments of the present disclosure.

In some embodiments, the set of resource may include of N resources and the resources are indicated by the indices from 0-N-1. Each resource in the set of the resources may include a number F1 of contiguous PRBs in one slot. Alternatively, each resource in the set of the resources may include a number F2 of contiguous PRBs in the plurality of the slots.

Since the resources on the same slot could not be used for receiving and transmitting simultaneously, therefore, for the case of the set of the resources including a number F2 of contiguous PRBs in the plurality of the slots, any two resources within the set of resources should be distributed in different slots. For example, the location of PRBs for one transmission resource may be specified.

For the case of the set of the resources including a number F2 of contiguous PRBs in the plurality of the slots, FIG. 6 shows an example of some embodiments of the present disclosure. As shown in FIG. 6, the slots 610₀-610₅ are distributed in the coordinate of time. Each PRBs in the time-frequency-domain are identified by the corresponding index of the set of resources. It can be seen from FIG. 6 that the two resources, for example, PRBs 620₀ and 620₁, within the set (index "6") of resources should be distributed in different slots.

As described above, the terminal device 110-1 may determine whether the terminal device 110-2 is located within the first zone, thus the terminal device 110-1 may determine the number of the terminal devices within the first zone. In order to preforming the resource selection, the terminal device 110-1 may ranking the first and the second terminal devices, (and other terminal devices, if any) within the range of the first zone.

Figure 7:
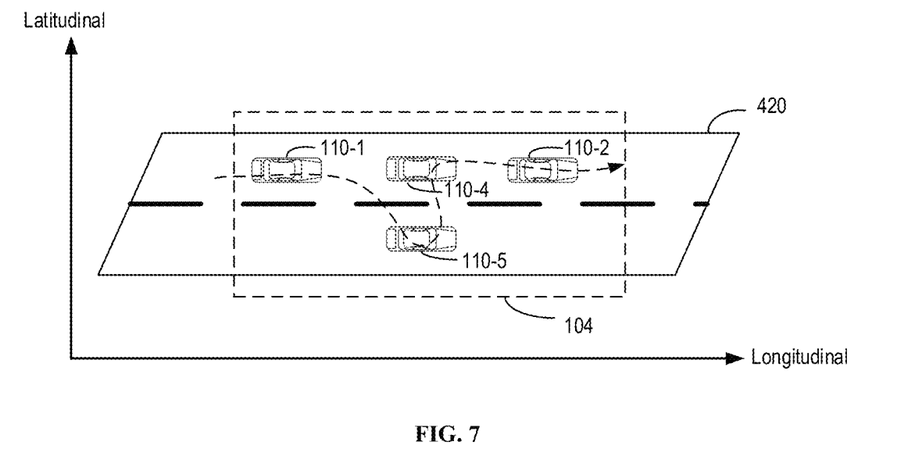
FIG. 7 shows an example of some embodiments of the present disclosure.

In some embodiments, the ranking may be performed in accordance with the following Equation:

$$I=x+Sy \quad (4)$$

where I may represent the index of the terminal device 110-1 based on the ranking performed in accordance with the Equation (4); x may represent the number of terminal devices within the range of the first zone with a longitudinal coordinate which is less than x0, x=0 if x0 is the smallest in the zone; Sy may represent the number of terminal devices within the range of the first zone with longitudinal coordinate which is equal to x0 and latitudinal coordinate which is less than y0, Sy=0 if there is no such terminal device; x0 is the longitudinal coordinate of the terminal device 110-1; and y0 is the latitudinal coordinate of the terminal device 110-1.

FIG. 7 shows an example of the ranking performed according to the Equation (4) in accordance with embodiments of the present disclosure. As shown in the FIG. 7, four terminal devices are located in the zone 104, namely terminal devices 110-1, 110-2, 110-4 and 110-5. According the Equation (4), the four terminal devices may be ranked based on the longitudinal coordinate. In a case of some of terminal devices having a same longitudinal coordinate, such as the terminal devices 110-4 and 110-5, the terminal devices having the same longitudinal coordinate may be ranked based on the latitudinal coordinate.

Figure 8:
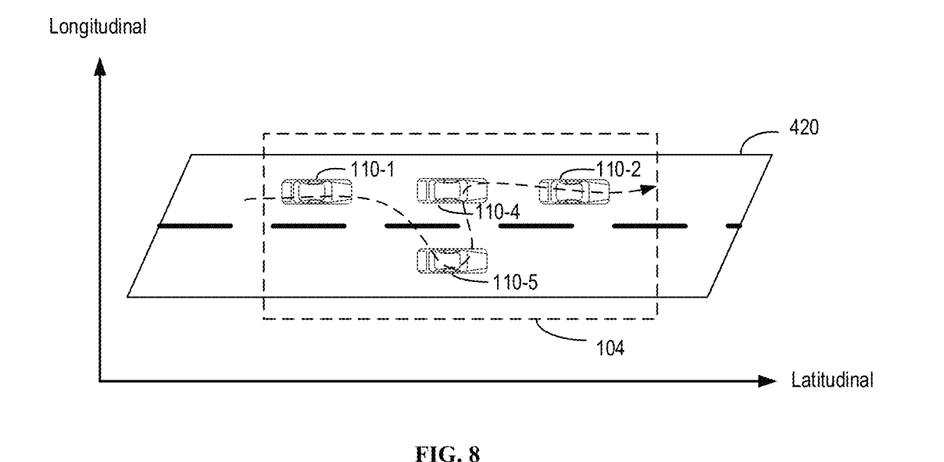
FIG. 8 shows an example of some embodiments of the present disclosure.

In some embodiments, the ranking may be performed in accordance with the following Equation:

$$I = y + Sx \qquad (5)$$

where I may represent the index of the terminal device 110-1 based on the ranking performed in accordance with the Equation (4); y may represent the number of terminal devices within the range of the first zone with a latitudinal coordinate which is less than y0, y=0 if y0 is the smallest in the zone; Sx may represent the number of terminal devices within the range of the first zone with latitudinal coordinate which is equal to y0 and longitudinal coordinate which is less than x0, Sx=0 if there is no such terminal device; x0 is the longitudinal coordinate of the terminal device 110-1; and y0 is the latitudinal coordinate of the terminal device 110-1.

FIG. 8 shows an example of the ranking performed according to the Equation (5) in accordance with embodiments of the present disclosure. As shown in the FIG. 8, four terminal devices are located in the zone 104, namely terminal devices 110-1, 110-2, 110-4 and 110-5. According the Equation (5), the four terminal devices may be ranked based on the latitudinal coordinate. In a case of some of terminal devices having a same latitudinal coordinate, such as the terminal devices 110-4 and 110-5, the terminal devices having the same latitudinal coordinate may be ranked based on the longitudinal coordinate.

By means of the ranking processes as described above, the terminal device 110-1 may determine that the terminal device 110-1 is $0^{th}$ terminal device within the first zone. Based on the relationship between the ranking of the terminal devices within the first zone and the indices of the set of resources allocated to the first zone, the terminal device 110-1 may determine the resource index indicating the resource used in the V2X communication of the terminal device 110-1. For example, as the terminal device 110-1 is $0^{th}$ terminal device within the first zone, the $0^{th}$ resource shown in FIG. 4 may be allocated to the terminal device 110-1.

Figure 9:
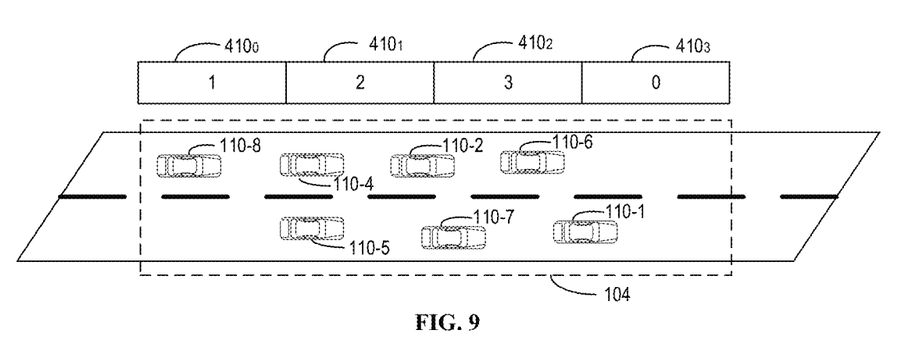
FIG. 9 shows an example of some embodiments of the present disclosure.

As mentioned above, based on the relationship between the ranking of the terminal devices within the first zone and the indices of the set of resources allocated to the first zone, the terminal device 110-1 may determine the resource index indicating the resource used in the V2X communication of the terminal device 110-1. In general, the terminal device 110-1 may determine the resource for the terminal device 110-1 to perform the V2X communication base on the following Equation:

$$r = I \bmod N \qquad (6)$$

where I may represent the index of the terminal device 110-1 based on the ranking; N may represent the number of resources in the set of the resources associated with the zone where the terminal device 110-1 is located; and r may represent the resource index of the terminal device 110-1.

FIG. 9 shows a diagram of an example in accordance with embodiments of the present disclosure. As shown in FIG. 9, terminal devices 110-1, 110-2, 110-4, 110-5, 110-6, 110-7 and 110-8 are located in the zone 104 and the resources $410_0$, $410_1$, $410_2$ and $410_3$ are the set of resources allocated to zone 104. Obviously, the number of the terminal devices in the zone 104 exceeds the number of resources in the set of resources. In this case, the resource index of the terminal device 110-1 may be determined based on the Equation (6). For example, as any ranking process as described above, the terminal device 110-8 may be the $0^{th}$ terminal device in the zone 104, while the terminal device 110-1 may be the $6^{th}$ terminal device in the zone 104. Thus, the resource index r of the terminal device 110-1 may be determined by r=6 mod 4, namely r=2 and the terminal device 110-1 may select a resource indicated by the resource index 2.

In some embodiments, the terminal device 110-1 may determine the resource used in the V2X communication of the terminal device 110-1 based on the resource index of a further terminal device obtained from the message. The resource index of a further terminal device may indicate the occupied resource within a predetermined set of resources associated with the terminal device 110-1.

In this case, the message is received from the second terminal device via a Physical Sidelink Control Channel (PSCCH) or a Physical Sidelink Share Channel (PSSCH) between the terminal device 110-1 and a further terminal device, for example, the terminal device 110-2. The terminal device 110-1 may obtain the occupation time of resource occupied by the terminal device 110-2.

In some embodiments, the terminal device 110-1 may determine a resource index indicating an available resource for the terminal device 110-1 to perform the V2X communication from the set of resources associated with the terminal device 110-1. In this case, the set of resources may be configured by the network device 120 or pre-configured and may not be dependent on the geographical location of the terminal device 110-1.

In some embodiments, the terminal device may determine a resource index from the unoccupied resource index in the set of resources associated with the terminal device 110-1. If all the resource indices in the set of resources associated with the terminal device 110-1 have been unoccupied, the terminal device 110-1 may determine signal strength on a channel between the terminal device 110-1 and other terminal devices, for example, the terminal device 110-2. For example, the terminal device 110-1 may obtain the signal strength of the channel between the terminal device 110-1 and the terminal device 110-2 based on the measurement of Reference Signal Received Power (RSRP). As an option, the terminal device 110-1 may obtain the signal strength of the channel between the terminal device 110-1 and the terminal device 110-2 from the message transmitted from the terminal device 110-2. If the terminal device 110-1 determines the signal strength is the lowest among all the measurements, or less than threshold strength, the terminal device 110-1 may determine the resource index of the terminal device 110-2 as the resource index of the terminal device 110-1.

In some embodiments, the terminal device 110-1 may determine the index and broadcast the reservation of the index before entering the area associated with the predetermined set of resources.

In the solution in accordance with some embodiments of the present disclosure, a scheme for resource selection supporting the aperiodic traffic in NR V2X communication is achieved, which also meets the stringent latency requirement for the V2X traffic.

Figure 10:
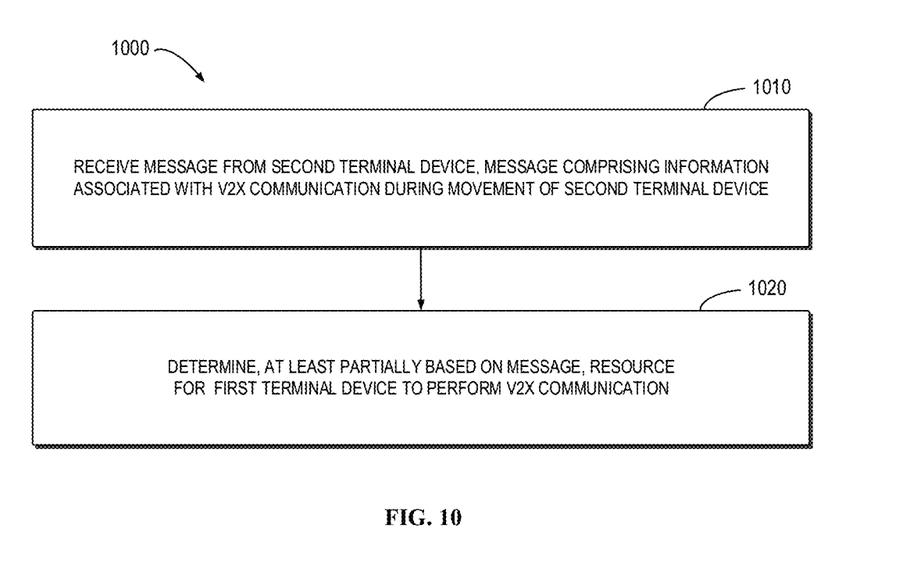
FIG. 10 shows a flowchart of an example method 1000 for resource selection according to some embodiments of the present disclosure.

FIG. 10 shows a flowchart of an example method 1000 for resources selection according to some example embodiments of the present disclosure. The method 1000 can be implemented at the terminal 110 as shown in FIG. 1. For the purpose of discussion, the method 1000 will be described with reference to FIG. 1.

At 1010, the terminal device 110-1 receives a message from the terminal device 110-2, the message comprises information associated with vehicle-to-everything (V2X) communication during movement of the terminal device 110-2.

In some embodiments, the terminal device 110-1 may receive at least one of: a geographical location of the terminal device 110-2; a velocity of the terminal device 110-2; an acceleration of the terminal device 110-2; a direction of the movement of the terminal device 110-2; and a second resource index indicating a resource used in the V2X communication of the terminal device 110-2.

At 1020, the terminal device 110-1 determines a resource for the terminal device 110-1 to perform the V2X communication at least partially based on the message.

In some embodiment, the terminal device 110-1 may determine, based on the message, whether the terminal device 110-2 is located within a first zone where the terminal device 110-1 is located. If the terminal device 110-2 is located within the first zone, the terminal device 110-1 may rank the first and the terminal device 110-2 within the range of the first zone. The terminal device 110-1 may determine a first resource index based on a result of the ranking and indices of a set of resources allocated to the first zone, the first resource index indicating the resource for the terminal device 110-1 to perform the V2X communication.

In some embodiment, the terminal device 110-1 may determine the first zone based on information associated with the V2X communication during movement of the terminal device 110-1. The terminal device 110-1 may further obtain a geographical location of the terminal device 110-2 from the message. If the geographical location is in a scope of the first zone, the terminal device 110-1 may determine that the terminal device 110-2 is located within the first zone.

In some embodiment, the terminal device 110-1 may determine at least one of: a zone identifier of the first zone; a length of the first zone; and a width of the first zone.

In some embodiment, the terminal device 110-1 may determine a first geographical location of the terminal device 110-1. The terminal device 110-1 may further obtain a second geographical location of the terminal device 110-2 from the message. The terminal device 110-1 may further rank the terminal devices 110-1 and 110-2 based on the first and the second geographical locations.

In some embodiment, the terminal device 110-1 may determine an association between the second resource index and indices of the set of resources associated with the first zone based on a result of the ranking. The terminal device 110-1 may further determine the second resource index based on the determined association.

In some embodiment, the terminal device 110-1 may obtain, based on the message, a second resource index indicating a resource used in the V2X communication of the terminal device 110-2. The terminal device 110-1 may further determine based on the second resource index, the first resource index indicating an available resource for the terminal device 110-1 to perform the V2X communication from a set of resources associated with the terminal device 110-1.

In some embodiment, the terminal device 110-1 may determine signal strength on a channel between the terminal device 110-1 and the terminal device 110-2. If the signal strength is the lowest among all the measurements, or less than threshold strength, the terminal device 110-1 may determine the first resource index as the second resource index.

In some embodiment, the message is received from the terminal device 110-2 via a Physical Sidelink Control Channel (PSCCH) or a Physical Sidelink Share Channel (PSSCH).

Figure 11:
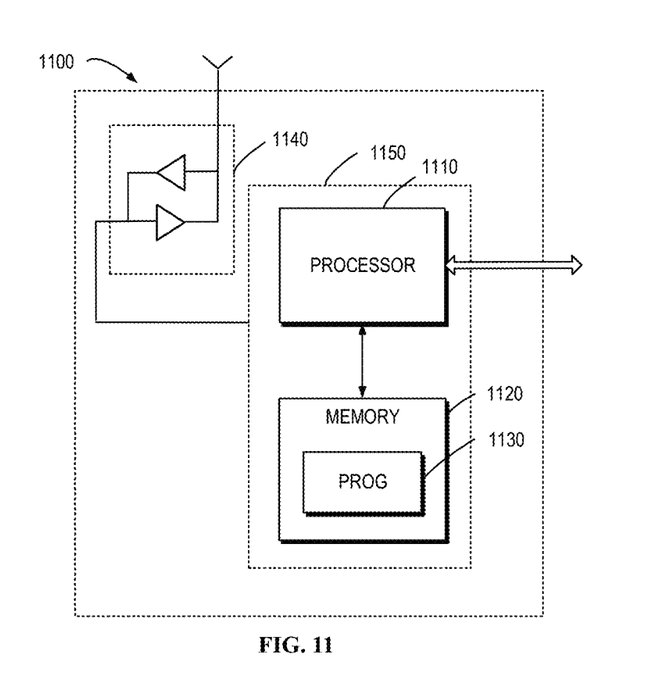
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of a terminal device 120 as shown in FIG. 1. Accordingly, the device 1100 can be implemented at or as at least a part of the terminal device 110.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 3 to 10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1110 may form processing means 1150 adapted to implement various embodiments of the present disclosure.

The memory 1110 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1110 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 to 11 Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:
   determining an index of a resource for vehicle-to-everything (V2X) communication by performing a modulo operation on a number of resources by using an identity of the terminal device; and
   performing the V2X communication based on the determined index of the resource.

2. A terminal device, comprising:
   a processor configured to:
   determine an index of a resource for vehicle-to-everything (V2X) communication by performing a modulo operation on a number of resources by using an identity of the terminal device; and
   perform the V2X communication based on the determined index of the resource.

3. A non-transitory computer readable medium having instructions stored thereon, the instructions, when executed on at least one processor, causing the at least one processor to:
   determine an index of a resource for vehicle-to-everything (V2X) communication by performing a modulo operation on a number of resources by using an identity of the terminal device; and
   perform the V2X communication based on the determined index of the resource.

* * * * *